3,636,052
HYDROXYARYLPOLYMETHYLENESULFONIUM ZWITTERIONS

Melvin J. Hatch, Socorro, New Mexico, and Masao Yoshimine, Hugh B. Smith, and Donald L. Schmidt, Midland, Mich., assignors to The Dow Chemical Company, Midland, Mich.
No Drawing. Filed Oct. 15, 1969, Ser. No. 866,763
Int. Cl. C07d 63/04, 65/00
U.S. Cl. 260—332.3 R         20 Claims

ABSTRACT OF THE DISCLOSURE

Hydroxyarylpolymethylenesulfonium salts of Formula I, prepared by condensation of a phenol and a polymethylenesulfide, can be converted into a sulfonium hydroxide inner salt II and then thermally polymerized to yield polymers containing a plurality of groups of Formula III:

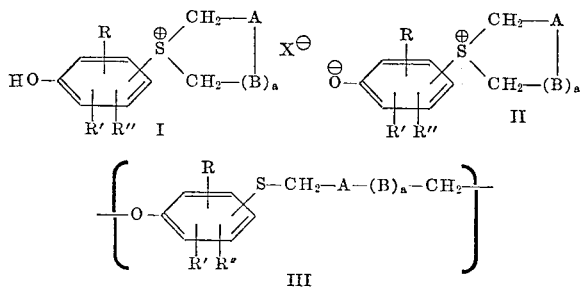

These polymers and copolymers are useful water resistant thermoplastic resins and impregnants.

BACKGROUND

The thermal lability of many sulfonium salts is recognized. Hatch Canadian Pat. 708,230 and British Pat. 960,029 describe film forming compositions containing a sulfonium binder which on heating forms a water insoluble film. Lloyd U.S. Pat. 3,409,660 and Kangas U.S. Pat. 3,322,737 use sulfonium salts as fugitive surfactants and stabilizers in thermally curing latex systems.

In the thermal polymerization of certain sulfonium carboxylate salts disclosed by Hatch, the condensation of the monomeric salt containing an equal number of positive and negative sites yields a neutral polyester and a by-product sulfide much as the classical "nylon salt" polymerization yields a neutral polyamide and water. Also like the nylon polymerization, these thermal sulfonium reactions also release a by-product which requires special processing for complete removal from the product.

STATEMENT OF THE INVENTION

A new class of cyclic sulfonium salts hase been discovered which form reactive inner hydroxide salts. These cyclic sulfonium inner hydroxides, containing an equal number of positive and negative charge sites, are very reactive monomers. They thermally polymerize without sulfide by-products, retaining the sulfur and attach organic groups in the polymer structure.

More specifically, new hydroxyarylpolymethylenesulfonium salts (I) have been prepared which are useful in the synthesis of cyclic sulfonium monomers (II) which on heating yield polymers containing a plurality of groups of Formula III: i.e.

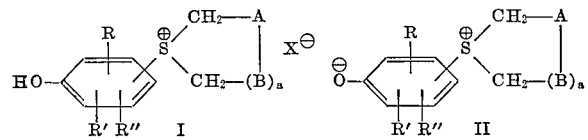

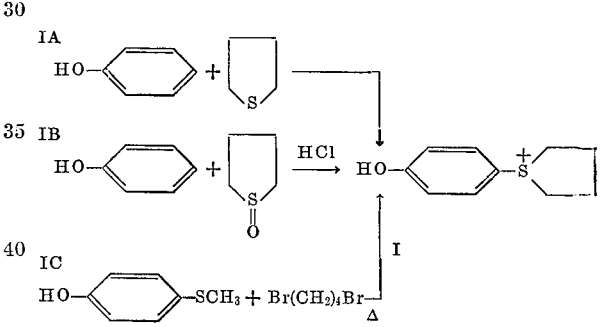

where each R and R' individually are H, Cl, Br, or $C_1$–$C_4$ alkyl;
R" is H, Cl, Br, OH or $OC_1$–$C_4$ alkyl;
the sulfur is ortho or para to the phenolic oxygen;
A and B independently are —CHR— and $a$ is 1 or 2, or
A and B in combination are —CH=CH— or

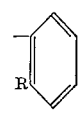

and
$X^\ominus$ is a nonbasic inorganic anion.

Preferably $X^\ominus$ is the anion of a strong inorganic acid.

GENERAL DESCRIPTION

Hydroxyarylpolymethylenesulfonium salts (I)

The hydroxyarylpolymethylenesulfonium salts (I) have been prepared from phenol and phenol derivatives by several general processes outlined as follows:

IA  HO—⟨ ⟩ + [S] ⟶
IB  HO—⟨ ⟩ + [S=O] —HCl→ HO—⟨ ⟩—S⁺⟨ ⟩  I
IC  HO—⟨ ⟩—SCH₃ + Br(CH₂)₄Br —Δ→

In process IA a phenol and tetramethylene-sulfide react at —40° C. to —10° C. in the presence of chlorine in the dark to give moderate 30–40% yields of the 4-hydroxyphenyltetramethylene sulfonium chlorides. At the lower temperatures, yields were improved by adding anhydrous HCl to the tetramethylenesulfide and then adding the phenol and Cl₂.

Alternately in process IB a phenol and tetramethylenesulfoxide or pentamethylenesulfoxide condense in the presence of a strong anhydrous acid such as HCl. Methanol can be used as a solvent. Low temperatures and a Lewis acid catalyst such as AlCl₃, SO₂, etc. are useful in minimizing side reactions and dark products.

Process IC involving reaction of an alkylthiophenol and a 1,4- or 1,5-dihaloalkane such as 1,4-dichlorobutane or 1,5-dibromopentane at an elevated temperature, normally about 100–200° C. is applicable with many substituted phenols and a variety of dihalides. Normally excess dihalide is used as a diluent and recovered along with the by-product alkyl halide.

By appropriate choice of reactants, process, and process conditions, a wide variety of hydroxyarylpolymethylenesulfonium salts have been prepared.

Typical phenol reactants include phenol, resorcinol, catechol, o-, m-, and p-cresol, p-sec. butylphenol, etc. Strong electron-withdrawing substituent groups, such as halogen, carboxylate, and nitro, deactivate the phenol and cause poor yields. Thus the halophenyl sulfonium salts are preferably prepared by direct halogenation of the aromatic ring of an appropriate hydroxyphenyl sulfonium salt. Useful sulfur-containing reactants include tetramethylenesulfide, tetramethylenesulfoxide, pentamethylenesulfoxide; 4-alkylthiophenols. Suitable dihalides are 1,4-dichlorobutane, 1,4-dichloro-2-hydroxybutane, 1,4-dichloro-2-methylbutane, and 1,5-dichloropentane.

Typical cyclic sulfonium salts useful herein include 4-hydroxyphenyltetramethylenesulfonium chloride,
4-hydroxy-3-methylphenyltetramethylenesulfonium chloride,
4-hydroxy-3,5-dichlorophenyltetramethylenesulfonium chloride,
2,4-dihydroxyphenyltetramethylenesulfonium chloride,
4-hydroxyphenyl-3-hydroxytetramethylenesulfonium chloride,
4-hydroxyphenyl-pentamethylenesulfonium chloride, and
4-hydroxy-3,5-dichlorophenyl-3-methyltetramethylenesulfonium chloride.

The cyclic sulfonium salts with a nonbasic inorganic anion such as chloride, bromide perchlorate or bisulfate are generally stable, crystalline salts at room temperature. They are soluble in polar hydroxylic solvents such as water, methanol and isopropanol. Stable mono- or dihydrates have been isolated of some chlorides. Illustrative of their chemical stability is the chlorination of 4-hydroxyphenyltetramethylenesulfonium chloride with sulfuryl chloride or chlorine to yield 3-chloro- and 3,5-dichloro-4-hydroxyphenyl salts.

Purification of the salts can be achieved by crystallization from a mixed solvent such as methylene chloride-methanol, conversion into an insoluble salt, e.g., sulfate or perchlorate, or precipitation from aqueous solution with a precipitant diluent such as dioxane, tetrahydrofuran, or higher alcohol.

Hydroxyarylpolymethylenesulfonium hydroxide inner salt (II)

Conversion of the stable sulfonium salt (I) into the reactive sulfonium hydroxide inner salt or zwitterion (II) is achieved by known methods. Ion-exchange with an anion-exchange resin in hydroxide form is particularly suitable. For some salts direct treatment with a strong inorganic base in a solvent such as anhydrous alcohol in which the by-product inorganic salt has limited solubility is preferred.

The cyclic sulfonium hydroxide zwitterion frequently is obtained as a stable crystalline hydrate. For example, the 4-oxyphenyltetramethylenesulfonium hydroxide zwitterion is obtained at room temperature in a crystalline needle dihydrate form. Attempts to remove the water of hydration by vacuum drying at room temperature result in polymerization. However, the corresponding 4-oxy-3,5-dichlorophenyl zwitterion is stable in anhydrous form at room temperature.

Polymerization

Thermal polymerization of the hydroxyarylpolymethylenesulfonium hydroxide zwitterions (II) is a facile reaction involving attack of the phenolic anion on a methylene carbon adjacent to the sulfonium group of the heterocyclic ring. Polymerization has occurred during attempted vacuum drying of hydrated salts at room temperature. More rapid polymerization of the solid monomers is achieved by simple heating, often for only a few minutes at relatively moderate temperatures of about 40°–200° C. Thus the crystalline 4-hydroxyphenyltetramethylenesulfonium hydroxide zwitterion dihydrate changes from translucent to opaque when rapidly heated above 100° C. and forms a moderately viscous melt at about 155° C. which on cooling crystallizes to a glossy, brittle, white solid resin. Short fibers can be pulled from the melt. Thermal homopolymers have been obtained with reduced specific viscosities of about 0.05–0.70 as determined as 1% solutions in chlorobenzene at 105° C.

Copolymers can be made from mixtures of two or more sulfonium monomers either blended as finely ground solids or in solution. Copolymers with the 4-hydroxy-3,5-dichlorophenyl sulfonium zwitterion have improved self-extinguishing fire resistant properties. In general the other copolymer properties are intermediate between those of the corresponding homopolymers.

Higher molecular weights are normally obtained by polymerizing in the absence of oxygen. In some instances, addition of a nucleophilic amine initiator increases the polymer molecular weight. With hydrated monomers, gradual heating reduces foaming during the condensation.

Once polymerized, products can be fabricated from the polymer in conventional ways. Alternately, the monomer can be placed in a mold and polymerized in situ. Films can be cast from solutions of the cyclic sulfonium monomers in water or other polar solvents such as methanol, methanol-acetone mixtures, dimethylsulfoxide, etc. On heating to remove the solvent polymerization occurs with formation of coherent polymer films containing a plurality of groups of Formula III.

The following examples are given as further illustrations. Unless otherwise indicated, all parts and percentages are by weight.

EXAMPLE 1

Preparation of cyclic sulfonium salts (A) TETRAMETHYLENESULFIDE PROCESS (1A)

To 120 ml. (1.36 mole) of tetrahydrothiophene was added 58.5 g. (1.6 mole) of HCl at −25 to −20° C. Then about 70.5 g. (1 mole) of $Cl_2$ at −25 to −20° C. was added over 1 hour. To the yellowish reaction mixture was added slowly a solution of 94 g. (1 mole) of phenol in 80 ml. of tetrahydrothiophene, controlling the temperature between −20 to −25° C. When two-thirds of the phenol solution was added, the reaction mixture exothermed to −10° C. The addition was stopped and the reaction mixture was again cooled to −25 to −20° C. Another 105 ml. of tetrahydrothiophene was added and slurry was stirred for an additional 1 hour at −25 to −20° C. and allowed to warm up to 0° C. before terminating the reaction with an acetone-ether mixture. The product was filtered, washed with ether, and crystallized from a 20/80 acetone/methanol mixture to give 102 g. (47.5% yield) white crystals of 4-hydroxyphenyltetramethylenesulfonium chloride.

This process has been used successfully with resorcinol, catechol and alkylphenols, but yields are poor with halophenols.

(B) TETRAMETHYLENESULFOXIDE PROCESS (1B)

To a solution of 23.5 g. (0.25 mole) of phenol in 26 g. (0.25 mole) of tetrahydrothiophene oxide was added 26 g. (0.71 mole) of HCl over a period of 0.5 hour at 0 to 10° C. The reaction was stirred for about 1 hr. at 0°–10° C. The resulting sulfonium salt was washed with an ether-methanol mixture to yield 48 g. (89%) of air-dried white crystals.

In another run, HCl was added to a cold solution of 94 g. (1 mole) of phenol and 104 g. (1 mole) of tetrahydrothiophene oxide in 300 ml. of methanol. During the addition of HCl the temperature was controlled between 0 and 5° C. After the exotherm had ceased (one hr.) the solvent has partly removed under vacuum at 30–40° C. to give a slurry. The solid salt was washed with ether and recrystallized from methanol-ether to yield 108.3 g. (50%) of a white solid with an equivalent weight of 218 (theory 216.5).

Like Process 1A, Process 1B give poor yields with halophenols. The haloaryl salts are better prepared by direct halogenation of a preformed hydroxyaryl sulfonium salt.

(C) ALKYLTHIOPHENOL PROCESS (1C)

A mixture of 28 g. (0.2 mole) of 4-methylthiophenol and 178.5 g. (0.84 mole) of 1,4-dibromobutane was heated for 6 hrs. at 120° C. with evolution of methyl bromide. Cooling gave a white crystalline mass which was washed thoroughly with acetone and dried to yield 48.3 g. (92.5%) of 4-hydroxyphenyltetramethylenesulfonium bromide with an equivalent weight of 261 (theory 259). Its structure was confirmed by chemical and spectral analyses. The 60 mHz. proton NMR spectrum (p.p.m. shielding relative to internal TMS) in DMSO$d_6$ exhibits a 4H absorption (CH$_2$—CH$_2$) at −2.35; a 2H absorption

at −3.72; a 2H absorption

at 3.92; a 2H doublet (J=9Hz.) (aromatic) at −7.13 and a 2H doublet (J=9 Hz.) (aromatic) at −7.80.

Process 1C is particularly suitable for preparing tetramethylene and pentamethylene sulfonium salts with substituent groups on the heterocyclic ring.

(D) DIRECT HALOGENATION

Chlorine was added to a stirred solution of 25 g. (0.12 mole) of 4-hydroxyphenyltetramethylenesulfonium chloride in 105 g. acetic acid cooled in an ice bath and excluded from light. During the chlorination which required about 1.25 hr. the reaction temperature was held below 35° C. The colorless crystalline solid salt was recovered and washed with ether. Drying gave 28 g. (82%) of 4-hydroxy - 3,5 - dichlorophenyltetramethylenesulfonium chloride. The product is unstable in salt form and should be converted into the zwitterionic form before extended storage.

EXAMPLE 2

Prep. of cyclic zwitterion monomer (A) ION EXCHANGE PROCESS

About 320 ml. of a wet strong base anion-exchange in hydroxide form (0.34 mole Dowex 1–X8 resin, 3.5 meq. Cl−/g. dry wt.) was dewatered with methanol and slurried with methanolic solution of 46 g. (0.21 mole) of 4-hydroxyphenyltetramethylenesulfonium chloride for 0.75 hr. Another 125 ml. of resin in OH− form was added and the mixture slurried until the methanol gave a negative test for chloride. Then the solution was filtered and concentrated by evaporation under reduced pressure at room temperature. The thick residual syrup was diluted with acetone to precipitate 38 g. (79%) of a stable white powder having an equivalent weight of 217.5 (theory 216).

Alternately the methanolic solution of the sulfonium salt was passed through a column containing excess methanol washed strong-base anion-exchange resin in OH− form. The column eluent was concentrated and the zwitterion monomer recovered as a dihydrate.

The structure of the cyclic switterion monomer was confirmed by chemical and spectral analyses. The 60 mHz. proton NMR spectrum (p.p.m. shielding relative to internal TMS) in DMSO$d_6$ exhibits a 4H broad absorption (—CH$_2$—CH$_2$—) at −2.17; 4H absorption

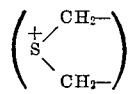

at −3.74; 2H doublet (J=9 Hz.) (aromatic) at −6.10 and 2H doublet (J=9 Hz.) (aromatic) at −7.10.

Analysis.—Calcd. for C$_{10}$H$_{12}$OS·2H$_2$O (percent): C, 55.6; H, 7.5; S, 14.8. Found (percent): C, 55.3; H, 7.4; S, 14.8.

(B) METATHESIS PROCESS

A solution of 151 g. (0.53 mole) of 4-hydroxy-3,5-dichlorophenyltetramethylenesulfonium chloride in 320 g. anhydrous methanol was titrated with 450 ml. of 1 N NaOCH$_3$ in anhydrous methanol to an end point at about pH 10.3 determined with glass electrodes. The cold mixture was filtered to remove NaCl and then concentrated under reduced pressure. The white solid residue was ground, washed free of residual chloride, and dried in vacuum yielding 105 g. (80%) of the 3,5-dichloro zwitterion monomer.

Analysis.—Calcd. for C$_{10}$H$_{10}$Cl$_2$OS (percent): C, 48.22; H, 4.02; Cl, 28.46. Found (percent): C, 48.11; H, 4.35; Cl. 29.0.

EXAMPLE 3

Polymerization (A) An open glass ampoule containing 1.0 pt. of 4-hydroxyphenyltetramethylenesulfonium hydroxide (inner salt) was heated in a vacuum oven at 160° C. for 0.5 hr. yielding 0.82 pt. of a solid polymer having a reduced specific viscosity of 0.16 as determined as a 1% solution in chlorobenzene at 105° C.

(B) In another experiment with the same monomer, 35.0 pts. sealed under nitrogen in a glass ampoule was polymerized at 160° C. for 0.5 hr. The resulting hard billet was ground and dried at 70° C. for 1.25 hr. It had a reduced specific viscosity of 0.16.

(C) About 50 parts of 4-hydroxy-3,5-dichlorophenyltetramethylenesulfonium hydroxide (inner salt) was heated in vacuo at 175° C. for 5 hr. On cooling a very tough, opaque polymer was obtained with a 1% reduced specific viscosity in chlorobenzene at 105° C. of 0.50. Its molecular weight determined by membrane osmometry in chlorobenzene at 70° C. was about 46,000. It had a glass transition temperature (T$_g$) of about 10° C. and a crystalline melting point (T$_m$) of about 150° C.

The polymer structure was confirmed by chemical and spectral analyses. Its 60 Hz. proton spectrum in hexachlorobutadiene at 150° C. (p.p.m. shielding relative to internal TMS) exhibits a 4H absorption (—CH$_2$—CH$_2$—) at −1.80; a 2H absorption (S—CH$_2$) at −2.85; a 2H absorption (O—CH$_2$) at −3.93 and a 2H singlet (aromatic) at −7.14.

Analysis.—Calcd. for C$_{10}$H$_8$Cl$_2$SO (percent): C, 48.22; H, 4.02; Cl, 28.46; S, 12.8. Found (percent): C, 48.20; H, 4.09; Cl. 28.80; S, 12.0.

The polymer was stable for 15 days in boiling water. Samples immersed for 15 days in 30% H$_2$O$_2$, concentrated HCl, and 1 N NaOCH$_3$ in methanol showed no indication of reaction. However, concentrated HNO$_3$ rapidly attacked the sulfide links. Samples of the polymer film 0.15 mm. thick were immersed for 7 days in a number of organic solvents. Weight increases of less than 4% and volume increases of less than 1% were found with acetone, naphtha and dimethylsulfoxide. Toluene and chloroform were absorbed with 4–6% swelling.

A sample annealed for 2 days at 110° C. and 7 days at 70° C. was molded at 155° C. and then its mechanical properties were determined. It had a tensile strength of 4100 p.s.i., a tensile modulus of 1.28×10$^5$ p.s.i., an elongation >260%, and an impact strength >16 ft. lb./in. of notch. The unannealed polymer had a tensile strength of 2960 p.s.i., a tensile modulus of 0.91×10$^5$ p.s.i., an elongation >260% and an average impact strength of 1.8 ft. lb./in of notch.

EXAMPLE 4

Cyclic sulfonium monomers and polymers

The general procedures of Examples 1–3 have been used to prepare a variety of cyclic sulfonium salts defined by Formula I, the corresponding zwitterion monomers of Formula II, and polymers and copolymers of Formula III. Optimum process conditions were not determined. Spectral and chemical analyses were consistent with the structures shown by these formulas. Typical properties of these materials are given in Table I.

TABLE I.—CYCLIC MONOMERS AND POLYMERS

| Ex. | Structure | Substituents (I/II) R | R' | R" | A | (B)₀ | Monomer salt (I) | Zwitterion monomer (II) | Polymer (III) |
|---|---|---|---|---|---|---|---|---|---|
| 4-1 | HO—⬡—S⁺⟨⟩ Br⁻ | H | H | H | CH₂ | CH₂ | Method 1C. HBr salt. Eq. wt: Calculated 261. Found 259. | II.2H₂O. Eq. wt.: Calculated: 216. Found: 217. Calculated: C, 55.5; H, 7.5; S, 14.8. Found: C, 55.3; H, 7.4; S, 14.8. | Hard, opaque solid η_sp=0.16. |
| 4-2 | HO—⬡—S⁺⟨⟩ Br⁻ (CH₃) | CH₃ | H | H | CH₂ | CH₂ | Method 1C. HBr salt | II.2H₂O. Eq. wt.: Calculated: 230. Found: 238. | Hard polymer. |
| 4-3 | HO—⬡—S⁺⟨⟩ Cl⁻ (CH₃) | CH₃ | CH₃ | H | CH₂ | CH₂ | Method 1B. HCl salt monohydrate. Eq. wt: Calculated 263. Found 260. | II.2H₂O. Eq. wt.: Calculated: 244. Found: 247. Calculated: C, 59.0; H, 8.25; S, 13.1. Found: C, 58.7; H, 8.04; S, 13.1. | Hard polymer η_sp=0.15. |
| 4-4 | HO—⬡—S⁺⟨⟩ ClO₄⁻ (fused benzene) | H | H | H | ⬡ (benzene) | — | — | Polymerized when isolated | Hard, brittle polymer. |
| 4-5 | HO—⬡(Cl)—S⁺⟨⟩ ClO₄⁻ | Cl | H | H | CH₂ | CH₂ | Chlorination of 4-1. HClO₄ salt. Calculated: C, 38.2; H, 3.82; Cl, 3.99; S, 10.5; Found: C, 38.2; H, 3.94; Cl, 3.94; S, 9.83. | II.H₂O. Calculated: C, 51.6; H, 5.64; Cl, 15.2; S, 13.8. Found: C, 52.1; H, 5.04; Cl, 15.1; S, 13.7. | Rubbery polymer η_sp=0.20. |
| 4-6 | HO—⬡(Cl)(Cl)—S⁺⟨⟩ ClO₄⁻ | Cl | Cl | H | CH₂ | CH₂ | Chlorination of 4-1. HClO₄ Salt. Calculated: C, 34.4; H, 3.16; Cl, 22.6; S, 9.2. Found: C, 34.8; H, 3.17; Cl, 22.5; S, 8.6. | Calculated: C, 48.22; H, 4.02; Cl, 28.5; S, 12.8. Found: C, 48.11; H, 4.35; Cl, 29.0; S, 12.5. | Tough polymer η_sp=0.50. MW~46,000. |
| 4-7 | HO—⬡—S⁺⟨OH⟩ Br⁻ | H | H | H | CHOH | CH₂ | Method 1C. HBr salt. Calculated: C, 48.32; H, 4.73; Br, 28.85. Found: C, 48.23; H, 4.78; Br, 28.02. | Not isolated | Hard polymer. |
| 4-8 | HO—⬡(Cl)—S⁺⟨OH⟩ Br⁻ | Cl | H | H | CHOH | CH₂ | Method 1C. HBr salt. Calculated: C, 40.97; H, 4.47; Br, 27.26; S, 10.9. Found: C, 40.95; H, 4.42; Br, 27.05; S, 10.9. | do | Brittle. |
| 4-9 | HO—⬡(Cl)(Cl)—S⁺⟨OH⟩ Cl⁻ | Cl | H | H | CHOH | CHOH | Chlorination of 4-8. HCl salt | Calculated.: C, 42.78; H, 3.56. Found.: C, 43.20; H, 4.30. | Hard, brittle. |
| 4-10 | HO—⬡—S⁺⟨CH₃⟩ Cl⁻ | H | H | H | CHCH₃ | CH₂ | Method 1B. HCl salt. Calculated.: C, 57.28; H, 6.55; Cl, 15.36. Found: C, 56.2; H, 6.67; Cl, 15.23. | Not isolated | Brittle. |

TABLE I.—CYCLIC MONOMERS AND POLYMERS—Continued

| Ex. | Structure | Substituents (I/II) R | R' | R'' | A | (B)ₐ | Monomer salt (I) | Zwitterion monomer (II) | Polymer (III) |
|---|---|---|---|---|---|---|---|---|---|
| 4-11 | (structure) | Cl | Cl | H | CHCH₃ | CH₂ | Chlorination of 4-10. HCl salt. Calculated: C, 44.09; H, 4.37; Cl, 35.49. Found: C, 43.90; H, 4.59; Cl, 34.68. | Calculated: C, 50.20; H, 4.60; Cl, 26.94. Found: C, 50.00; H, 4.98; Cl, 26.40. | Rubbery η_sp=0.25. |
| 4-12 | (structure) | CHCH₃ C₂H₅ | H | H | CH₂ | CH₂ | Method 1B. HCl salt | Not isolated | Gummy polymer. |
| 4-13 | (structure) | CH₃ | H | | CH₂ | CH₂ | ......do...... | II.2/3 H₂O. Calculated: C, 64.04; H, 7.48; S, 15.5. Found: C, 64.1; H, 7.7; S, 15.5. | Brittle polymer. |
| 4-14 | (structure) | Cl | Cl | CH₃ | CH₂ | CH₂ | Method 1B. HCl salt.1/2 H₂O. Calculated: C, 42.81; H, 4.57; S, 10.38. Found: C, 43.5; H, 5.08; S, 10.31. | II.1/2 H₂O. Calculated: C, 48.53; H, 4.81; S, 11.77. Found: C, 48.5; H, 5.27; S, 11.85. | Tough, opaque polymer η_sp=0.285. |
| 4-15 | (structure) | OH | H | H | CH₂ | CH₂ | Method 1B. HCl salt. Calculated: C, 51.63, H, 5.59. Found: C, 51.38; H, 5.90. | Calculated: C, 61.22; H, 6.12; S, 16.34. Found: C, 61.41; H, 6.24; S, 16.1. | Hard, yellow polymer. |
| 4-16 | (structure) | OH | H | H | CH₂ | CH₂ | Method 1B. HCl salt | | Soft film. |
| 4-17 | (structure) | H | H | H | CH₂ | (CH₂)₂ | Method 1C. HBr salt. Calculated: C, 48.07; H, 5.49; Br, 29.03. Found: C, 48.25; H, 5.25; Br, 28.94. | | Waxy solid. |
| 4-18 | (structure) | Cl | Cl | H | CH₂ | (CH₂)₂ | Chlorination of 4-17 | Tetrahydrate. Calculated: C, 50.2; H, 4.6; S, 12.2. Found: C, 50.2; H, 4.7; S, 12.3. | Rubbery polymer. |

We claim:
1. A hydroxyarylpolymethylenesulfonium salt of Formula I:

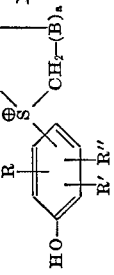

where each R and R' individually are H, Cl, Br, OH or OC₁–C₄ alkyl;
R'' is H, Cl, Br, OH or OC₁–C₄ alkyl;
the sulfur is ortho or para to the phenolic oxygen;
A and B independently are —CHR—, and a is 1 or 2;
X⊖ is an acidic inorganic anion.

2. The sulfonium salt of claim 1 where R, R' and R'' are H.

3. The sulfonium salt of claim 1 where R is Cl and R' and R'' are H.

4. The sulfonium salt of claim 1 where R and R' are Cl and R'' is H.

5. The sulfonium salt of claim 1 where R'' is OH and R and R' are H.

6. The sulfonium salt of claim 1 where —A—(B)ₐ— is —CH₂CH₂—.

7. The sulfonium salt of claim 1 where —A—(B)ₐ— is —CH₂CH₂CH₂—.

8. The sulfonium salt of claim 1 having the formula:

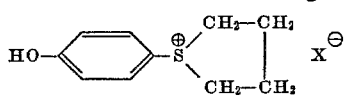

9. The sulfonium salt of claim 1 having the formula:

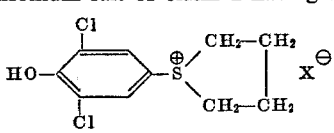

10. The sulfonium salt of claim 1 where $X^\ominus$ is an anion of a strong inorganic acid.

11. A water-soluble hydroxyaryl-polymethylenesulfonium hydroxide (inner salt) of Formula II:

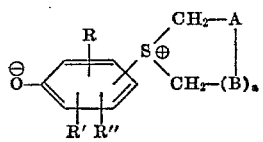

where each R and R' individually are H, Cl, Br, or $C_1$–$C_4$ alkyl; R" is H, Cl, Br, OH or $OC_1$–$C_4$ alkyl; the sulfur is ortho or para to the phenolic oxygen; and A and B independently are —CHR—, and $a$ is 1 or 2.

12. The sulfonium hydroxide (inner salt) of claim 11 where R, R' and R" are H.

13. The sulfonium hydroxide (inner salt) of claim 11 where R is Cl and R' and R" are H.

14. The sulfonium hydroxide (inner salt) of claim 11 where R and R' are Cl and R" is H.

15. The sulfonium hydroxide (inner salt) of claim 11 where R" is OH and R and R' are H.

16. The sulfonium hydroxide (inner salt) of claim 11 where —A—(B)$_2$— is —$CH_2CH_2$—.

17. The sulfonium hydroxide (inner salt) of claim 11 where —A—(B)$_a$— is —$CH_2CH_2CH_2$—.

18. The sulfonium hydroxide (inner salt) of claim 11 having the formula:

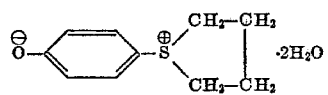

19. The sulfonium hydroxide (inner salt) of claim 11 having the formula:

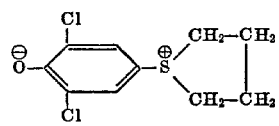

20. The sulfonium hydroxide (inner salt) of claim 11 having the formula:

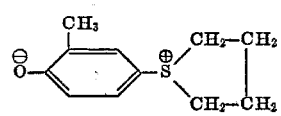

References Cited

UNITED STATES PATENTS

| | | | |
|---|---|---|---|
| 2,794,026 | 5/1957 | Johnston | 260—327 |
| 2,965,649 | 12/1960 | Johnston | 260—327 |
| 3,344,020 | 9/1967 | Greenbaum | 167—33 |

HENRY R. JILES, Primary Examiner

C. M. SHURKO, Assistant Examiner

U.S. Cl. X.R.

260—47, 327 TH, 330.5

FO-1050
(5/69)

UNITED STATES PATENT OFFICE
CERTIFICATE OF CORRECTION

Patent No. 3,636,052                           Dated    18 January 1972

Inventor(s)  Melvin J. Hatch, Masao Yoshimine, High B. Smith and Donald L. Schmid It is certified that error appears in the above-identified patent and that said Letters Patent are hereby corrected as shown below:

Column 2, line 15, change the formula to: 

Column 2, line 31 add --$Cl_2$-- to the formula so that it reads:

IA 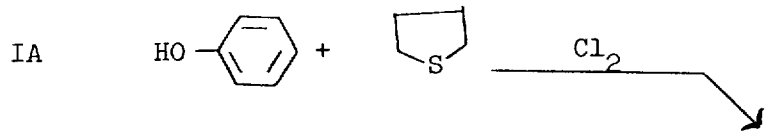

Column 11, line 2 of Claim 16, delete "-A-(B)$_2$-" and insert -- -A-(B)$_a$- --.

Signed and sealed this 11th day of July 1972.

(SEAL)
Attest:

EDWARD M. FLETCHER, JR.                ROBERT GOTTSCHALK
Attesting Officer                       Commissioner of Patents